United States Patent
Guzorek et al.

(10) Patent No.: US 11,904,543 B2
(45) Date of Patent: Feb. 20, 2024

(54) SYSTEM AND METHOD FOR GEOMETRICALLY CONSTRAINED AXISYMMETRIC ADJUSTABLE KINEMATIC MOUNT

(71) Applicant: Lawrence Livermore National Security, LLC, Livermore, CA (US)

(72) Inventors: Steven J. Guzorek, Livermore, CA (US); Adam W. Jaycox, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 68 days.

(21) Appl. No.: 17/466,809

(22) Filed: Sep. 3, 2021

(65) Prior Publication Data

US 2023/0073480 A1    Mar. 9, 2023

(51) Int. Cl.
*B29C 64/245* (2017.01)
*B33Y 40/00* (2020.01)
*B33Y 30/00* (2015.01)

(52) U.S. Cl.
CPC ......... *B29C 64/245* (2017.08); *B33Y 30/00* (2014.12); *B33Y 40/00* (2014.12)

(58) Field of Classification Search
CPC ......... B33Y 30/00; B33Y 40/00; B29C 64/20; B29C 64/25; B29C 64/245; B22F 12/30; B22F 12/38
See application file for complete search history.

(56) References Cited

U.S. PATENT DOCUMENTS

| | | | |
|---|---|---|---|
| 4,268,123 A | 5/1981 | Mesco | |
| 5,310,157 A * | 5/1994 | Platus | F16F 15/073 248/619 |
| 2002/0140296 A1* | 10/2002 | Ebihara | B23Q 1/621 310/12.06 |

* cited by examiner

*Primary Examiner* — Joseph S Del Sole
*Assistant Examiner* — Baileigh Kate Darnell
(74) *Attorney, Agent, or Firm* — HARNESS, DICKEY & PIERCE, P.L.C.

(57) ABSTRACT

The present disclosure relates to an adjustable mount apparatus. The apparatus may have a material support having a plurality of support legs, with each one of the support legs having a distal portion. A base assembly is used which has a plurality of laterally extending leg portions. A plurality of adjustably positionable capture subassemblies are slidably disposed within the laterally extending leg portions for releasably coupling to the distal portions of the support legs to hold the material support in a stable manner on the base assembly. A plurality of moveable elements, each being independently associated with one of the capture subassemblies, enable highly controlled linear movement of the capture subassemblies. Each capture subassembly engages with the distal portion of one of the support legs to exert a clamping force thereon, to affix the material support securely to the base assembly.

19 Claims, 13 Drawing Sheets

SYSTEM AND METHOD FOR GEOMETRICALLY CONSTRAINED AXISYMMETRIC ADJUSTABLE KINEMATIC MOUNT

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and method for supporting a substrate during an additive manufacturing operation, and more particularly to a geometrically constrained, axisymmetric, adjustable kinematic mount for supporting substrates, and particularly non-planar substrates, of differing dimensions in a highly stable configuration, and with highly repeatable location positioning accuracy.

BACKGROUND

The statements in this section merely provide background information related to the present disclosure and may not constitute prior art.

When utilizing 5-Axis contouring for the additive process Direct Ink Writing ("DIW"), the location of the substrate is critical for success and accurate printing of details of a part being made, and requires significant effort to find.

Presently available work holding systems utilize off the shelf solutions which provide a significant constraint to substrate design and reduced expected repeatability from full assembly.

With a highly repeatable mounting solution, the finding portion during a DIW operation only needs to be completed once. A highly repeatable mount which opens substrate design space is therefore needed to improve throughput and reduce cost during AM printing operations like DIW.

SUMMARY

This section provides a general summary of the disclosure, and is not a comprehensive disclosure of its full scope or all of its features.

In one aspect the present disclosure relates to an adjustable mount apparatus. The apparatus may comprise a material support having a plurality of support legs, with each one of the support legs having a distal portion. A base assembly may be included which has a plurality of laterally leg portions extending outwardly away from one another. A plurality of capture subassemblies may also be included which are slidably disposed within the laterally extending leg portions for releasably coupling to the distal portions of the plurality of support legs, to hold the support in a stable manner relative to the base assembly. A plurality of moveable elements may be included, with each being independently associated with one of the capture subassemblies for causing linear movement of a respective one of the capture subassemblies. Each capture subassembly is configured to slidably engage with the distal portion of a respective one of the support legs to exert a clamping force, in response to movement of its associated said moveable element, to cause each said capture subassembly to capture the distal portion of one of the support legs. This produces a clamping force on each said support leg which affixes the material support securely to the base assembly.

In another aspect the present disclosure relates to an adjustable mount apparatus. The apparatus may comprise a material support having a plurality of equidistantly circumferentially arranged, depending support legs, with each one of the said support legs having a distal portion. The apparatus may also include a base assembly having a plurality of laterally extending leg portions extending outwardly away from one another, with each laterally extending leg portion including an elongated support well for supporting a portion of an associated one of the support legs therein. The apparatus may further include a plurality of capture subassemblies slidably disposed within the laterally extending leg portions for releasably coupling to the distal portions of the plurality of support legs to hold the material support in a stable manner relative to the base assembly. The apparatus may further include a plurality of threaded lead screws, with each one of the plurality of threaded lead screws being rotationally moveable and being independently associated with one of the capture subassemblies for causing linear movement of a respective one of the capture subassemblies. A plurality of gears may also be included, with each one of the plurality of gears being fixedly secured to one end of an associated one of each of the plurality of threaded lead screws. A gear box may be included which is disposed at an axial center of the base assembly, and which includes a centrally disposed ring gear for interfacing with the gear associated with each said threaded lead screw, to enable corresponding rotational movement of all of the threaded lead screws when any one of the threaded lead screws is rotated, to thus enable corresponding simultaneous linear movement of all of the capture subassemblies when any one of the threaded lead screws is rotated. Each capture subassembly may be configured to slidably engage with the distal portion of a respective one of the support legs to exert a clamping force, in response to movement of its associated movable element, to cause each capture subassembly to capture the distal portion of one of the support legs. This causes a clamping force to be exerted on each support leg, to thus affix the support securely to the base assembly.

In still another aspect the present disclosure relates to a method for forming a support structure for use in an additive manufacturing operation. The method may include providing a material support having a plurality of support legs depending therefrom, with each one of the support legs having a distal portion. The method may further include using a base assembly to support the material support, wherein the base assembly has a plurality of laterally leg portions extending outwardly away from one another. The method may further include using a plurality of capture subassemblies slidably disposed within the laterally extending leg portions for releasably coupling to the distal portions of the plurality of support legs to hold the material support in a stable manner relative to the base assembly. The method may further include using a plurality of movable elements, with each one of the plurality of moveable elements being independently associated with one of the capture subassemblies, for causing linear movement of a respective one of the capture subassemblies in response to movement of its associated movable element. The method may further include using each capture subassembly to slidably engage with the distal portion of a respective one of the support legs to exert a clamping force, in response to rotational movement of its associated moveable element, to cause each capture subassembly to capture the distal portion of one of the support legs, and to exert a clamping force on each support leg, to affix the material support securely to the base assembly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to a novel axial symmetric, adjustable, kinematic mount apparatus that incorporates a new, non-influential, positive capturing mechanism. The new mount apparatus forms a means for providing exact and positive constraint to a significant range of mating components. Utilizing the new mount apparatus disclosed herein is expected to open the design space for mating components without compromising location accuracy and repeatability of the mating component. The present disclosure is ideally suited for supporting a printing substrate used in additive manufacturing applications such as Direct Ink Write (DIW) applications, and particularly when printing on a non-planar support substrate.

Figure 1:
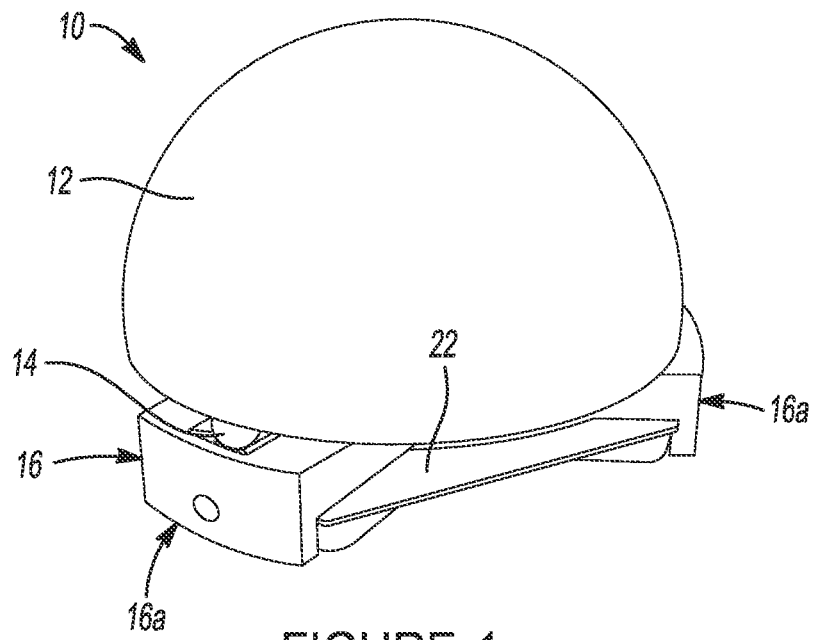
FIG. 1 is a perspective view of one embodiment of an axisymmetric kinematic mount apparatus in accordance with the present disclosure.

Referring to FIG. 1, axial symmetric, adjustable, kinematic mount apparatus 10 (hereinafter simply "mount apparatus" 10) is disclosed in accordance with one embodiment of the present disclosure. The mount apparatus 10 includes a semi-spherical material support 12 having a plurality of support legs 14, and a base assembly 16. The material support 12 forms a substrate for use in an additive manufacturing operation, for example a Direct Ink Writing (DIW) operation. As will be described in the following paragraphs, the base assembly 16 has features which enable it to be adjusted to accommodate material supports with leg spacings of differing dimensions, and to be attached thereto, to form a highly stable, highly location repeatable, mounting apparatus, which is of paramount importance in additive manufacturing applications such as DIW applications.

Figure 3:
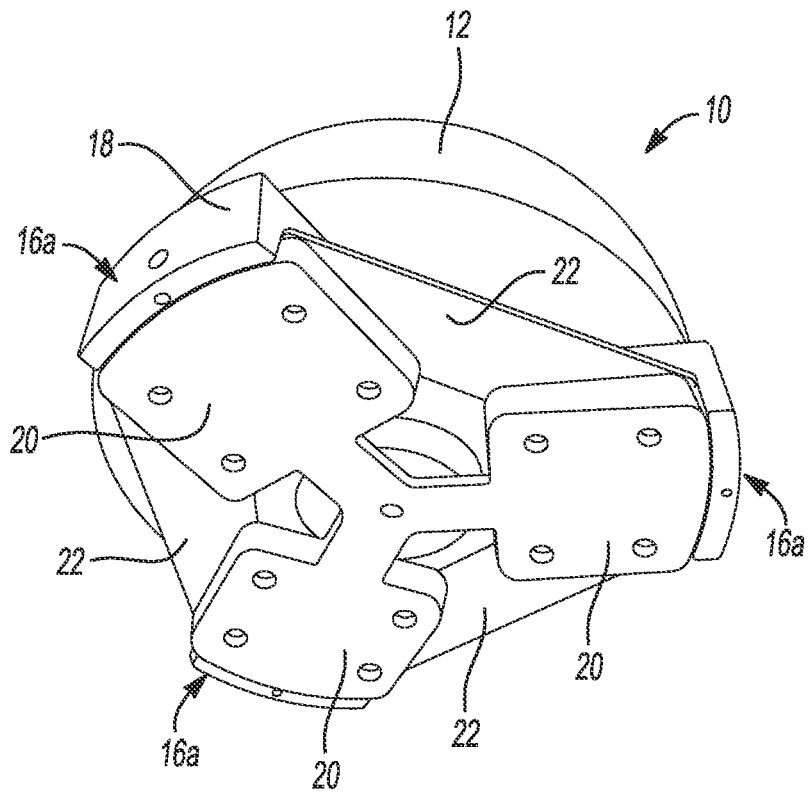
FIG. 3 is a bottom perspective view of the mount apparatus of FIG. 1.
Figure 2:
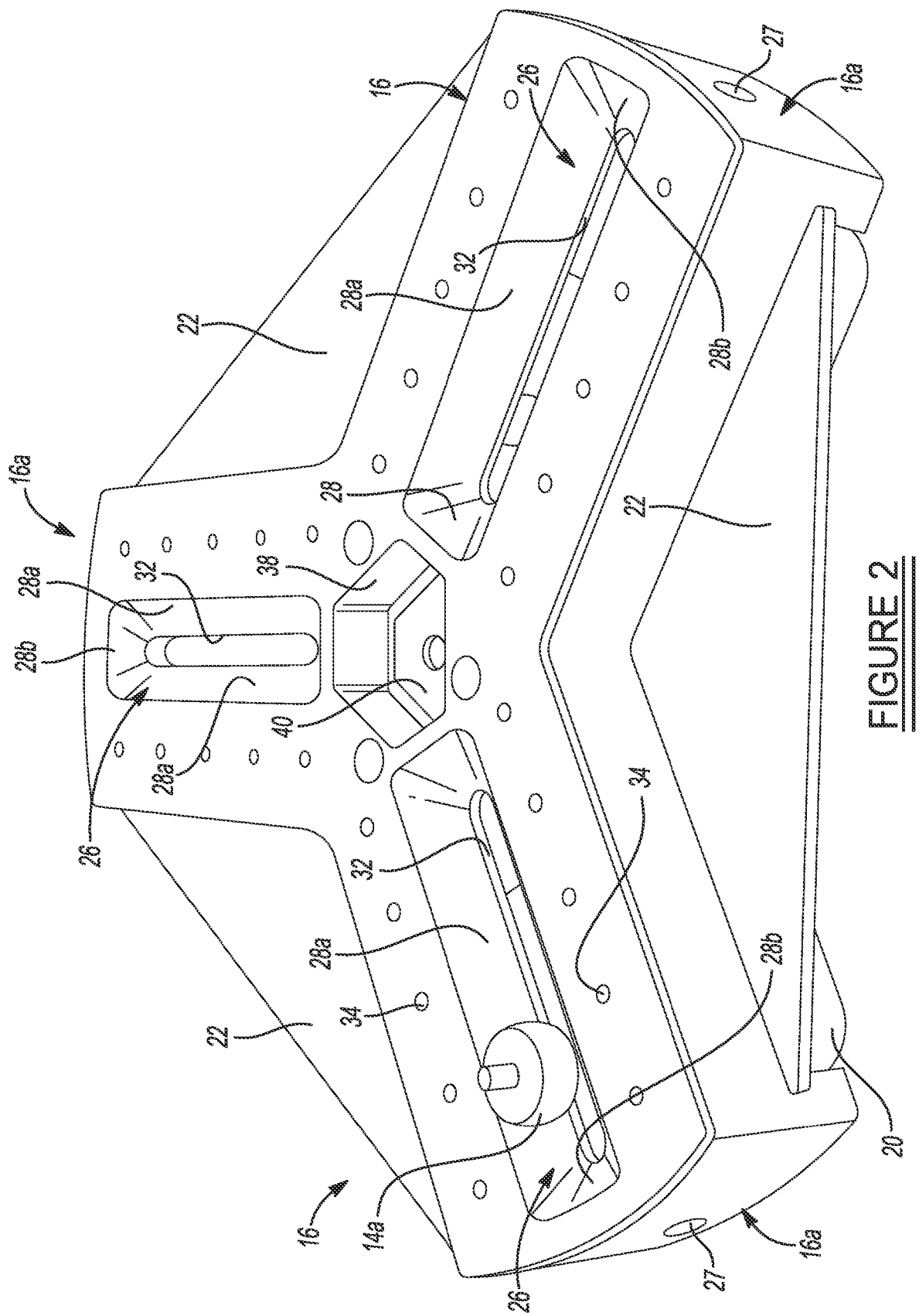
FIG. 2 is a top perspective view of the base assembly of the mount apparatus of FIG. 1 without the semi-spherical support present.

Referring to FIGS. 2 and 3, the construction of the base assembly 16 can be seen in greater detail. FIG. 3 shows the base assembly 16 with the semi-spherical material support 12 removed except for one support leg 14. The base assembly 16 includes a main base 18 and a motion base 20. Optionally a plurality of decorative panels 22 may be secured to or sandwiched between portions of the main base 18 and the motion base 20. The base assembly 16 is axisymmetric in that, in this example, it includes three laterally extending leg portions 16*a* which are equidistantly spaced 120 degrees from one another to form a highly stable supporting structure. It will be appreciated, however, that the base assembly 16 could be formed with more than three laterally extending support legs 16 if desired, but the use of three laterally extending legs provides an exceptionally stable support arrangement on planar or slightly non-planar surfaces.

Figure 4:
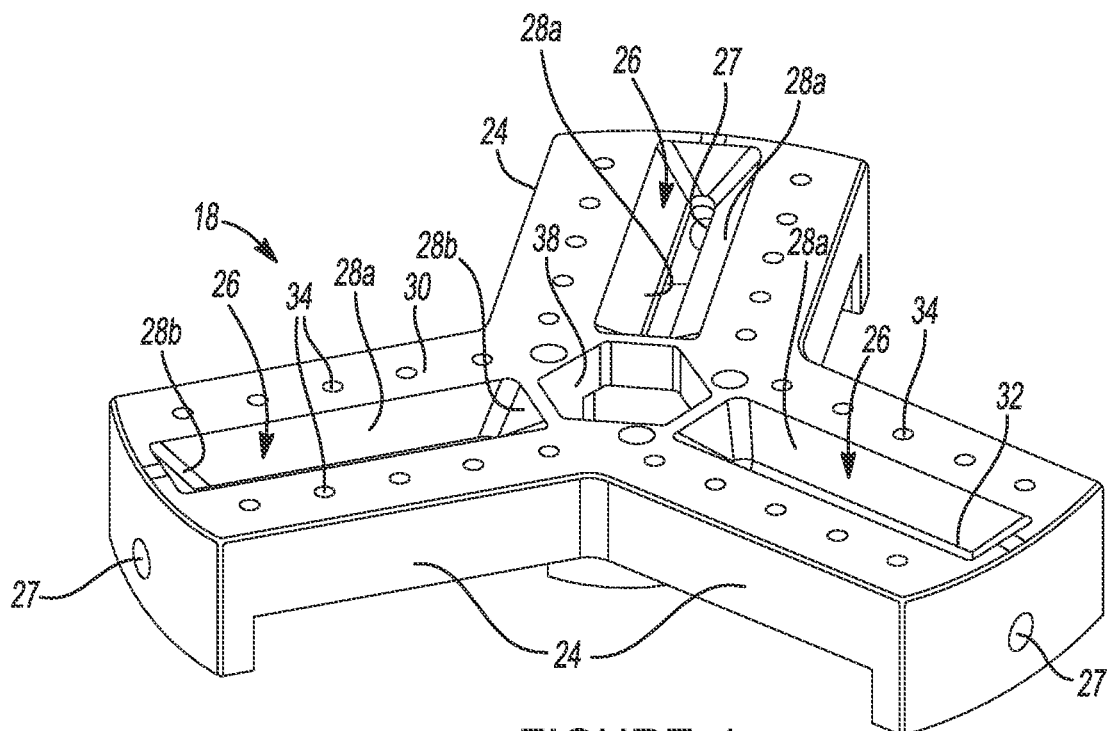
FIG. 4 is a top perspective view of just the main base of the base assembly.
Figure 5:
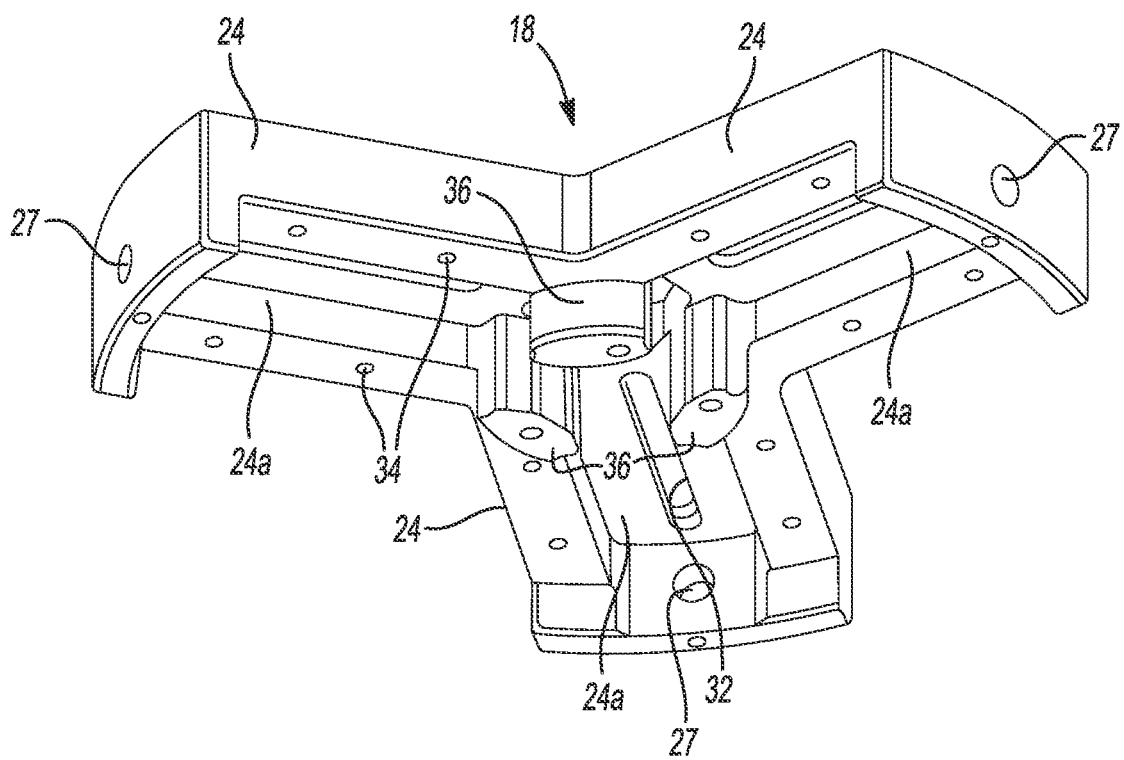
FIG. 5 is a bottom perspective view of the main base.

In FIGS. 2, 4 and 5 the main base 18 can be seen in greater detail. The leg portions 16*a* are formed in part by laterally extending legs 24 of the main base 18, which each include an elongated support well 26 (FIGS. 2 and 4). A bore 27 is formed at an end of each laterally extending leg 24, which opens into an area below its associated elongated support well 26.

Each elongated support well 26 also has parallel diverging wall portions 28*a* that diverge away from one another as one moves from a bottom of the elongated support well 26 to an upper surface 30 of the main base 18. An additional pair of diverging wall portions 28*b* are formed at opposing ends of the each elongated support well 26. An elongated through slot 32 is formed in the bottom of each laterally extending leg 24 of the main base 18, and is positioned slightly above its associated bore 27. A plurality of holes 34 are formed in the upper surface 30 of the main base 18 which enable conventional threaded fasteners (not shown) to be used to help secure the main base 18 to the motion base 20. The plurality of holes 34 includes optional extra holes, beyond those needed for coupling the main base 18 to the motion base 20, to provide for additional versatility in possible future mounting configurations.

As shown in FIG. 2, the diverging wall portions 28 enable an angular or spherical element 14a of the support leg 14 to rest within the elongated support well 26 in a highly stable manner. FIG. 2 shows only one spherical element 14a to avoid cluttering the figure, but in practice one spherical element 14a will be supported independently in each of the elongated support wells 26. The diverging arrangement of the wall portions 28a also facilitates supporting spherical or angular elements of differing dimensions without any modification being needed to the main base 18.

With further reference to FIGS. 2, 4 and 5, an underside of the main base 18, visible in FIG. 5, can be seen to include a plurality of equidistantly spaced, depending legs 36 which help form a hexagonal-shaped opening 38 (FIGS. 2 and 4) in the main base. The depending legs 36 are spaced so that the hexagonal-shaped opening 38 is configured at an axial center of the main base 18, and thus at an axial center of the base assembly 16. The hexagonal-shaped opening 38 partially houses a hexagonal-shaped gearbox housing 40 at the axial center of the base assembly 16. Each leg 24 of the main base 18 also includes a recessed portion which forms an elongated guide channel 24a when the main base 18 is secured to the motion base 20.

Figure 6:
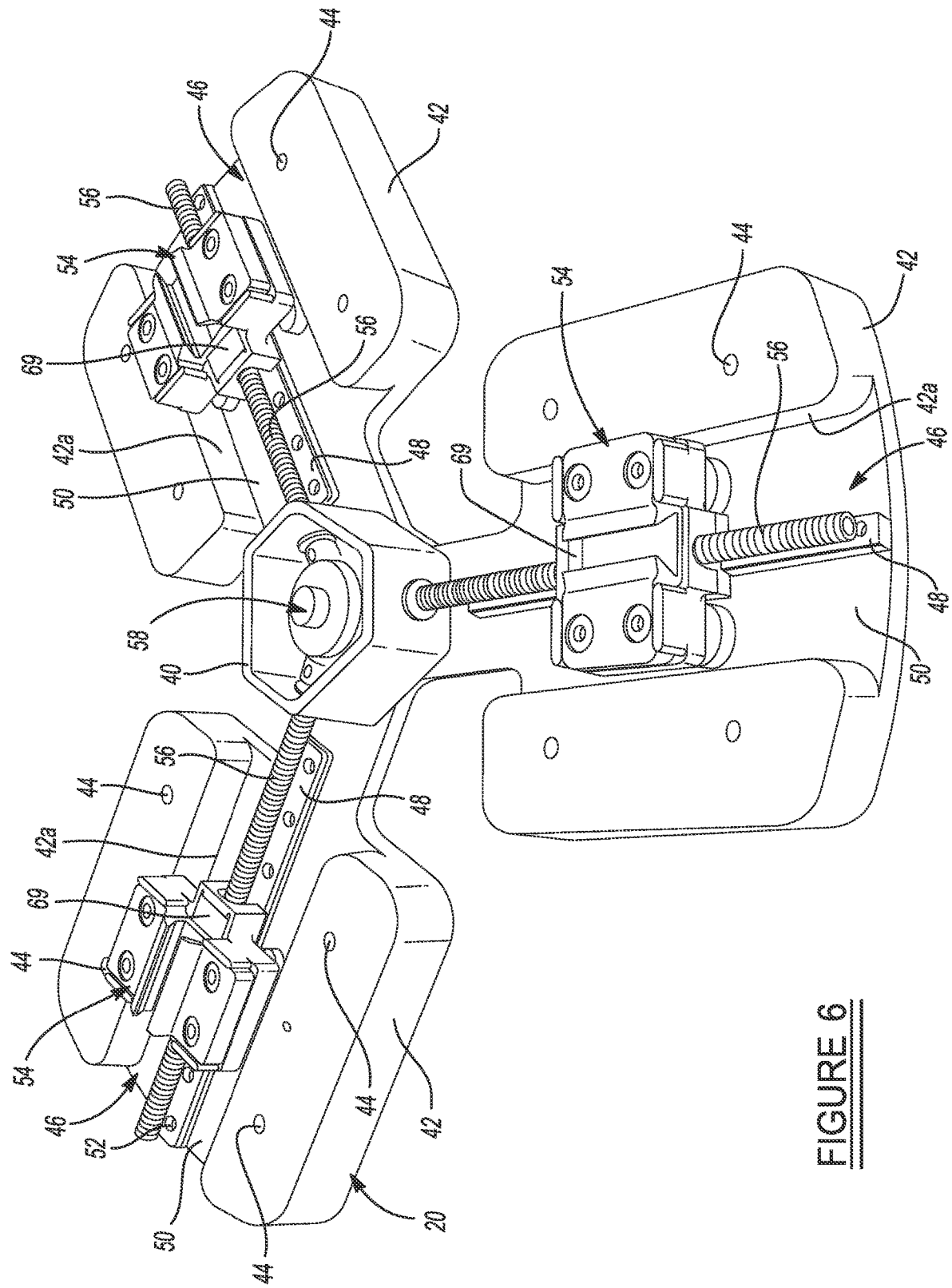
FIG. 6 is a top perspective view of just the motion base with its associated components, those being the gearbox housing, the gearbox, the acme screws, the guide bars and the capture subassemblies.

FIG. 6 shows the motion base 20 in greater detail together with a number of other components that are used to adjust the mount apparatus 10 to receive differently sized material supports 12. The motion base 20 has three equidistantly spaced, laterally extending base elements 42 which each have a plurality of holes 44 for receiving threaded fasteners (not shown), which enable the main base 18 to be secured to the base elements 42. In this regard it will be appreciated that the four holes 44 shown on each base element 42 align with four of the holes 34 on each leg 24 of the main base 18. When the main base 18 is secured to the base elements 42, recesses 42a in each base element cooperate with the recessed portions 24a in the legs 24 of the main base 18 to form elongated guide pathways 46. Each of the main base 18 and the motion base 20 may be formed from a wide variety of suitable materials, for example plastic, aluminum or other suitable strong and stable materials.

With further reference to FIG. 6, the laterally extending base elements 42 also each include a fixedly mounted guide bar 48 which is fixedly secured to an associated bottom wall portion 50 of its associated base element 42, within an associated one of the guide pathways 46. The securing may be accomplished via a plurality of threaded elements (e.g., threaded screws), which extend through holes 52 in each guide bar 48. Each guide bar 48 supports a slidable capture subassembly 54 thereon. The capture subassemblies 54 are approximately dimensioned to provide a small amount of lateral clearance relative to the dimensions of the pathways 46 so as to be moveable freely along their respective guide bars 52 but without any tangible twisting or rocking movement within the guide pathways 46.

With further reference to FIG. 6, each capture subassembly 54 has associated therewith a movable element in the form of an acme screw 56. Each acme screw 56 (i.e., lead screw) is threadably coupled to its associated capture subassembly 54 and also communicates with a gearbox 58 located within the hexagonal-shaped gearbox housing 40. As will be described further in the following paragraphs, rotation of any one of the acme screws 56 causes a corresponding linear movement of its associated capture assembly 54 along its associated guide bar 48. The gearbox 58 couples the rotational movement of the three acme screws 56 together in a manner that enables rotational movement of any one of the three acme screws 56 to cause a simultaneous, equal degree of rotation to be imparted to the other acme screws 56. This enables all three of the capture subassemblies 54 to be moved simultaneously, linearly, back and forth, along the bars 48, the exact same distances, by simply rotating any one of the acme screws 56 clockwise or counterclockwise. Thus, regardless of where an individual is standing relative to the mount apparatus 10, simply accessing and turning one of the acme screws 56 moves all of the capture subassemblies 54 inwardly or outwardly the exact same distance, and thus makes for an extremely convenient means for adjusting the mount apparatus 10 to accept and capture differently sized material support. To further facilitate ease of turning of the acme screws 56, each acme screw may also include a feature such as a slot, hex-shaped recess, Phillips screw recess, etc., at its outermost distal end, by which an individual can use a conventional tool (e.g., flat blade screwdriver, Phillips screwdriver, hex-shaped Allen wrench, etc.) to more easily turn the acme screw.

Figure 7:
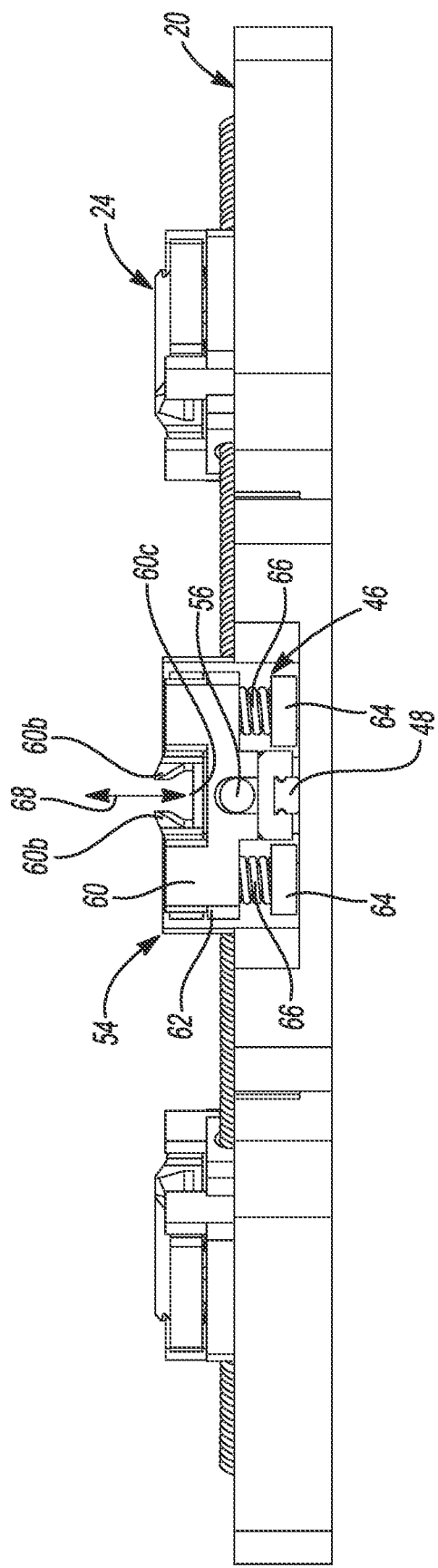
FIG. 7 is a side elevation view of the motion base further showing the configuration and assembly of the capture subassembly, the guide bar and the acme screw of one leg portion of the base assembly.
Figure 8:
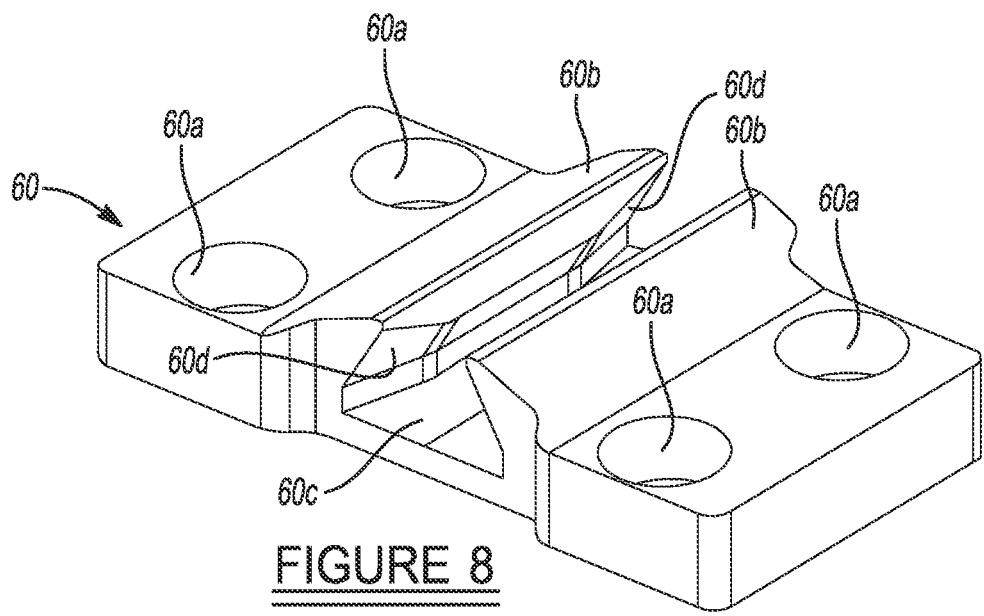
FIG. 8 is a top perspective view of the preload upper component of the capture subassembly.
Figure 9:
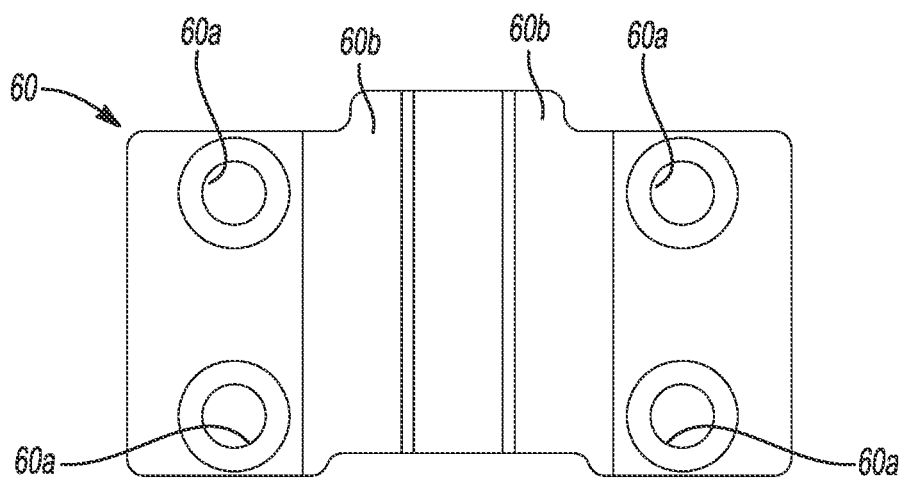
FIG. 9 is a plan view of the preload upper component of FIG. 8.
Figure 10:
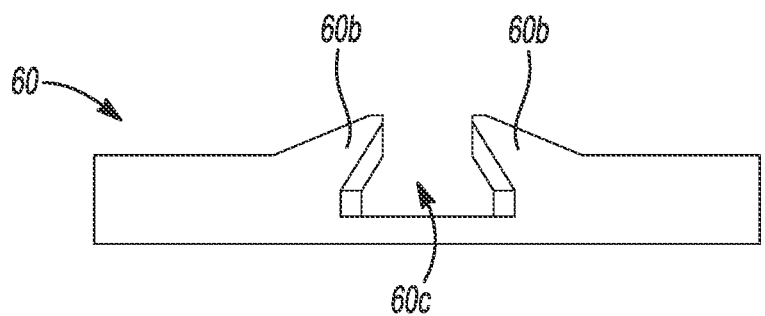
FIG. 10 is an end view of the preload upper component.
Figure 11:
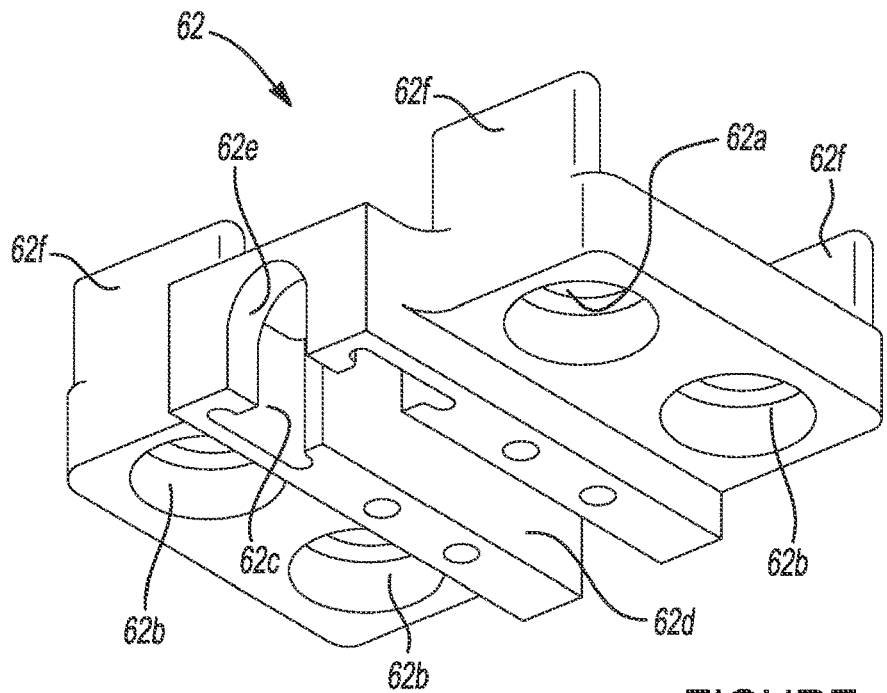
FIG. 11 is a lower perspective view of the preload lower component of the capture subassembly.
Figure 12:
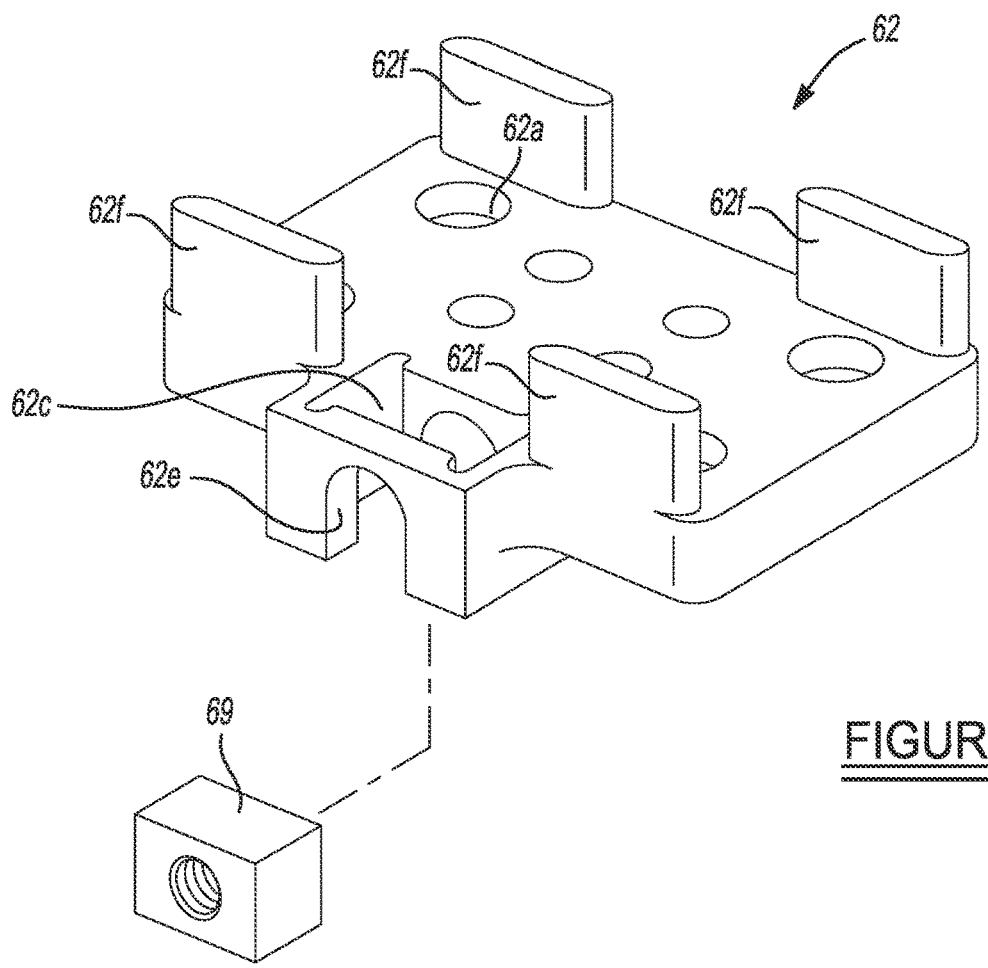
FIG. 12 is an upper perspective view of the preload lower component of FIG. 11.

With reference to FIGS. 7-12, the components and construction of the capture subassembly 54 can be seen in greater detail. In FIG. 7 the capture subassembly 54 includes a preload top component 60, a preload bottom component 62 and a plurality of preload studs 64 (four such preload studs 64 in this example) which extend through bores 62a in the preload bottom component and bores 60a in the preload top component. A corresponding plurality of four coil springs 66 (FIG. 7) are dimensioned to fit over shafts of the preload studs 64 and to provide a vertically oriented biasing force in accordance with arrow 68. The coil springs 66 rest in recesses 62b (FIG. 11) formed in a lower surface of the bottom preload component 62. In effect, the coil springs 66 provide a constant upward biasing force on the preload top and bottom components 60 and 62, respectively, when the capture assembly 54 is assembled and positioned within the guide pathway 46. The preload studs 64 further help to maintain the preload top and bottom components 60 and 62, respectively, aligned with one another once assembled together. A threaded drive element 69 (FIG. 12) is captured in a recess 62c (FIG. 11) on the underside of the preload bottom component 62, and is shaped in accordance with the recess 62c. The threaded drive element 69 engages both the guide bar 48 and the acme screw 56, which enables rotation of the acme screw to drive the threaded drive element 69, and thus impart sliding, linear, translating motion to the capture subassembly 54 along the guide bar 48.

With further reference to FIGS. 7-11, the preload bottom component 62 (FIGS. 11 and 12) includes a channel 62d and an opening 62e (FIGS. 11 and 12) which permit the acme screw 56 to extend fully through the preload bottom component 62 without interference. Four upwardly projecting bumper stops 62f form structures for locating and aligning the preload upper component 60 on the preload bottom component 62, as well as for providing positive stops for the capture subassembly 54 at its extreme opposite ends of linear travel within the recessed portion 24a of the laterally extending leg 24 of the main base 18.

With further reference to FIGS. 7-10, the preload top component 60 can be seen to include sloping, inwardly projecting wall portions 60b which form a capture channel 60c for capturing a portion of the leg assembly 14, as will be described further in the following paragraphs. The opposing ends of each inwardly projecting wall portion 60b also include a ramped surface 60d (visible in FIG. 8) which help to exert a downward pulling force on the leg assembly 14 as the capture subassembly 54 moves linearly and engages, and captures, the leg portion 14 in the capture channel 60c during a mounting operation. This downward pulling force pulls the entire semi-spherical material support 12 down onto the base assembly 16 during the mounting operation and makes for an extremely secure, stable attachment of the semi-spherical material support 12 to the base assembly 16 of the mount apparatus 10.

Figure 13:
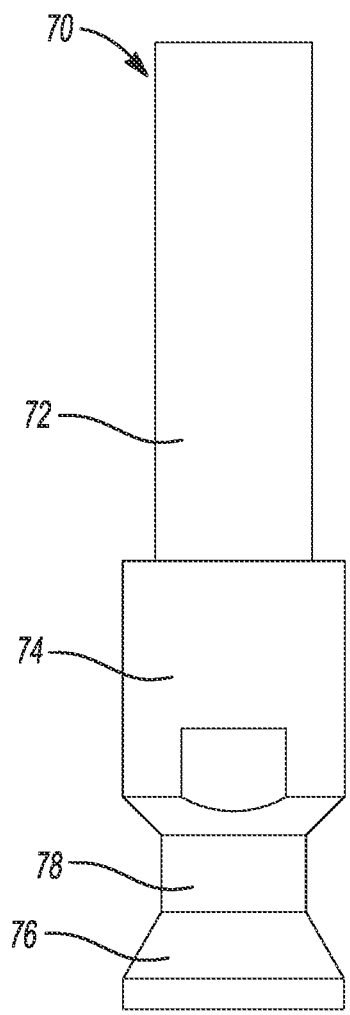
FIG. 13 is a side view of the pull down stud used with one of the leg assemblies.
Figure 14:
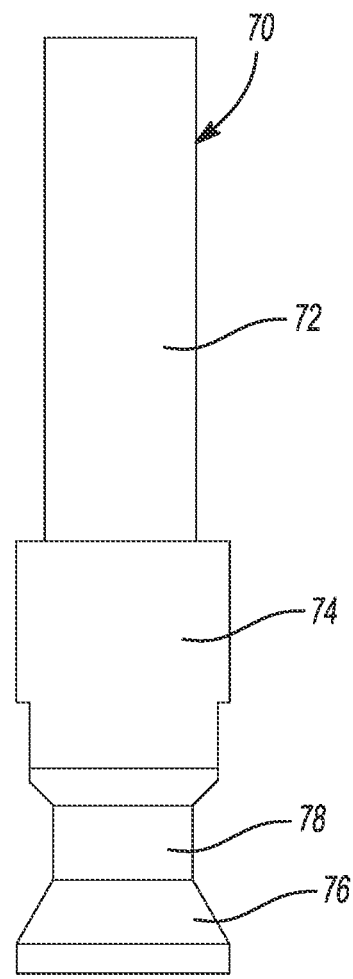
FIG. 14 is a side view of the pull down stud of FIG. 13 turned 90 degrees from the view of FIG. 13.
Figure 15:
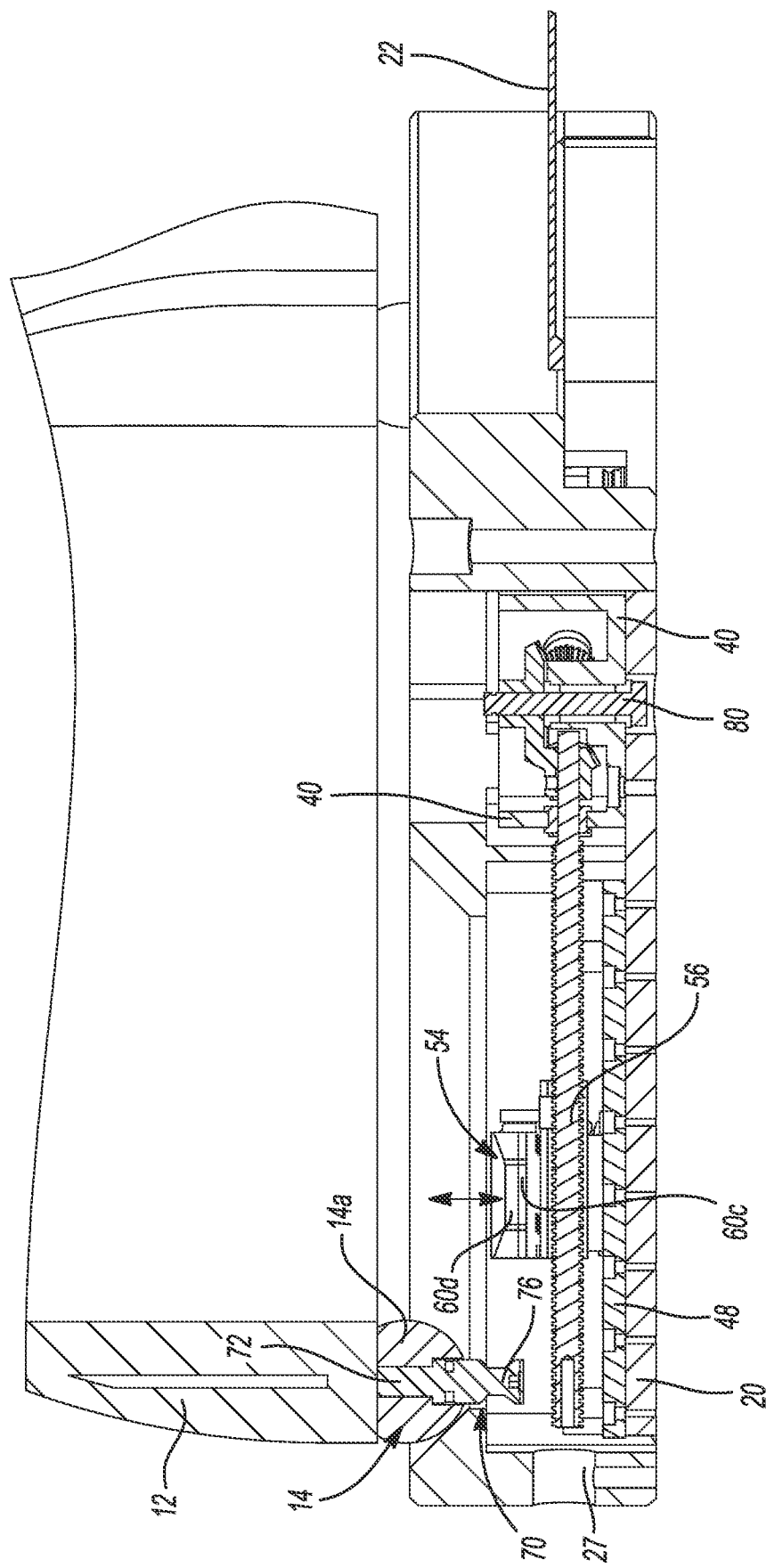
FIG. 15 is a partial cross-sectional side view of the base assembly showing the capture subassembly, acme screw and gearbox components.

Referring briefly to FIGS. 13, 14 and 15, a pull down stud 70, which is part of the support leg 14, is shown in greater detail. In FIGS. 14 and 15 the pull down stud 70 can be seen to include an upper portion 72, a central portion 74 and a distal portion forming a flaring lower portion 76. A space 78 is formed between the flaring lower portion 76 and the central portion 74.

With specific reference to FIG. 15, the upper portion 72 of the pull down stud 70 is secured fixedly (e.g., by adhesives or mechanical fasteners, not shown) within a suitably dimensioned bore in the semi-spherical element 14a of the leg assembly 14. The flaring lower portion 76 is dimensioned and tapered to fit within the capture channel 60c (FIG. 8) of the preload upper component 60 when the capture subassembly 54 moves linearly, horizontally into engagement with the flaring lower portion 76. The ramped surfaces 60d of the preload upper component 60 help to guide the flaring lower portion 76 into the capture channel 60c and to facilitate smooth engagement of the flaring lower portion 76 as engagement initially occurs, with the inwardly projecting wall portions 60b providing an additional degree of downward clamping force once the flaring lower portion 76 is fully captured within the capture channel 60c. Since the ramped surfaces 60d are present at both ends of the preload upper component 60, the engagement with the flaring lower portion 76 can be accomplished regardless if the capture subassembly 54 happens to be positioned inwardly or outwardly of the flaring lower portion 76 (relative to an axial center of the mount apparatus 10), simply by rotating one of the acme screws 56 in the proper direction to move the capture assembly 54 toward the flaring lower portion 76.

Figure 16:
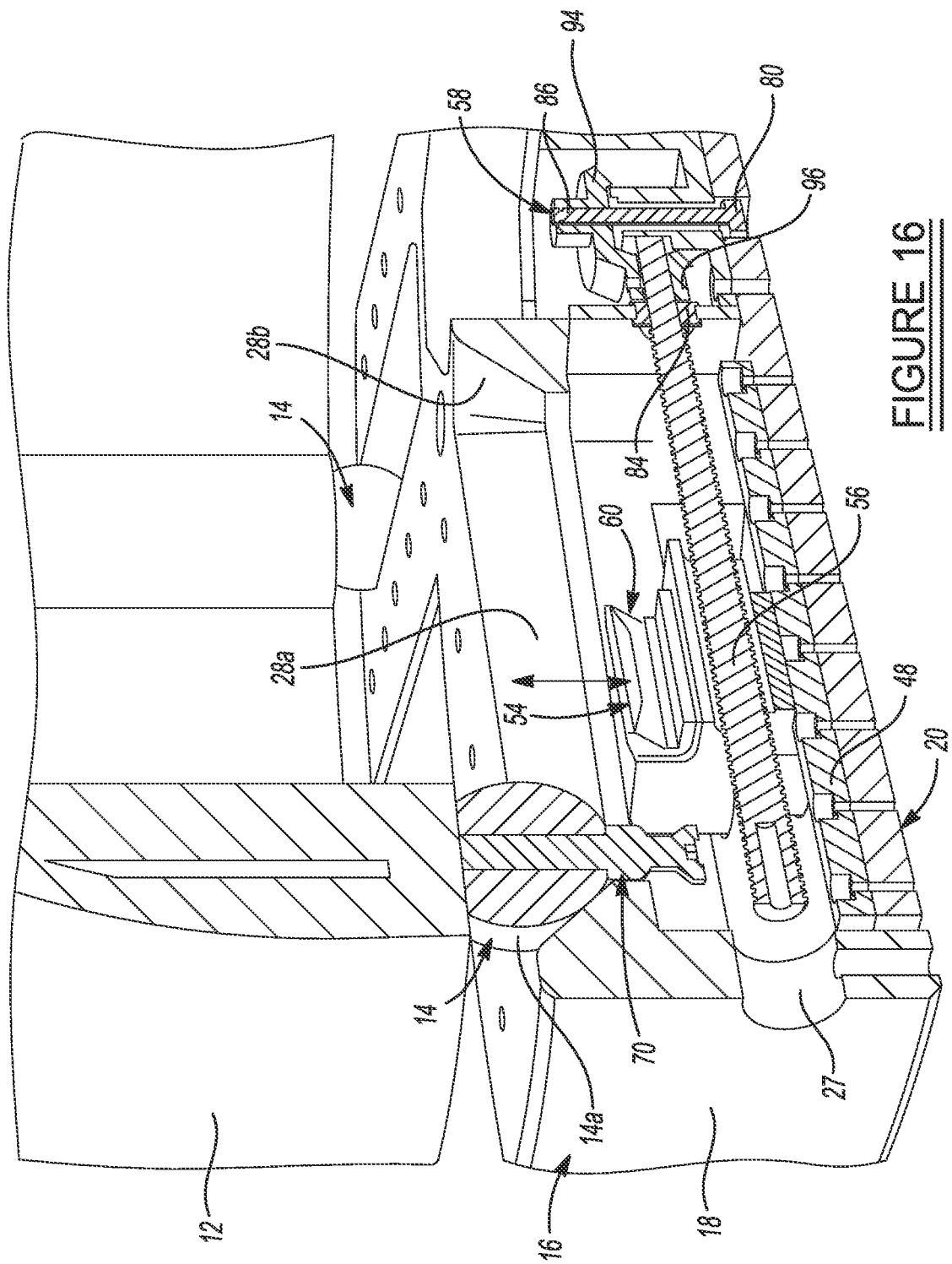
FIG. 16 is a perspective view of a portion of one of the leg portions of the base assembly further illustrating various components of the gearbox.
Figure 17:
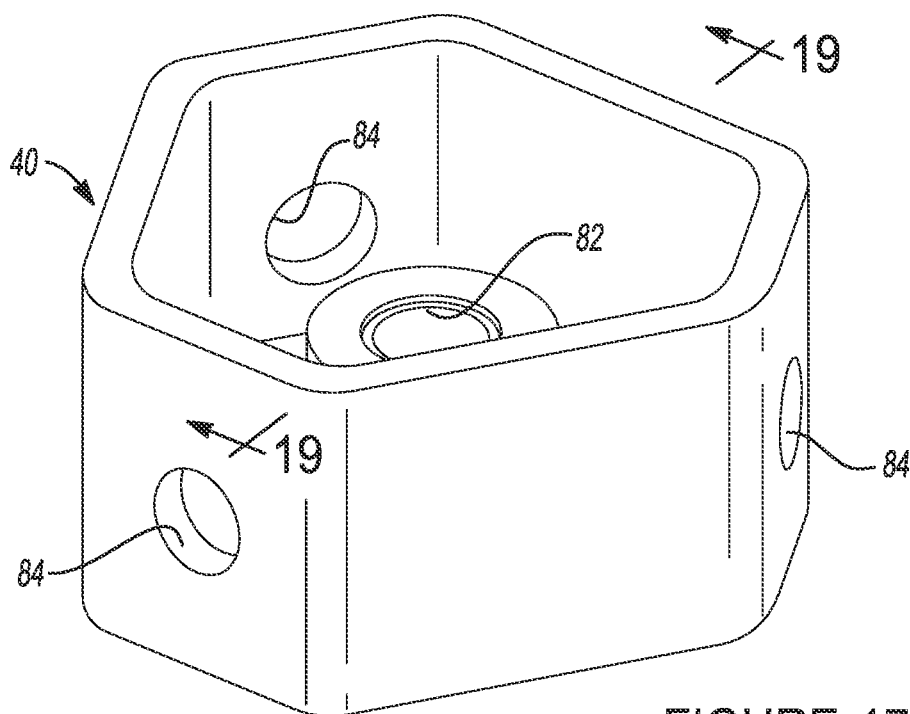
FIG. 17 is a top perspective view of the gearbox housing.
Figure 18:
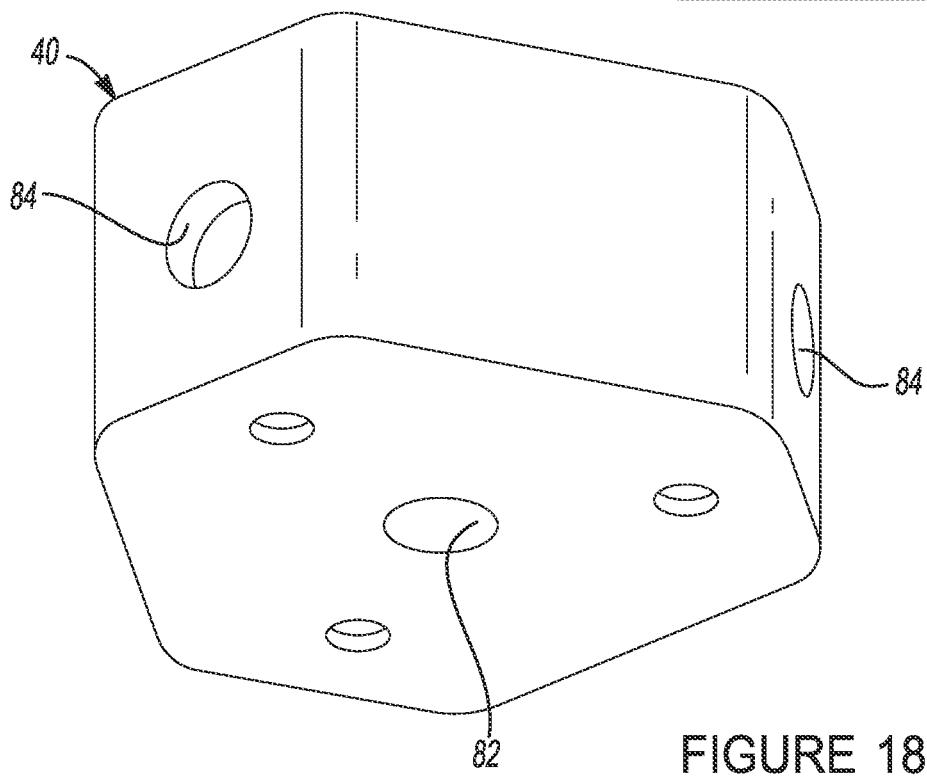
FIG. 18 is a bottom perspective view of the gearbox housing.
Figure 19:
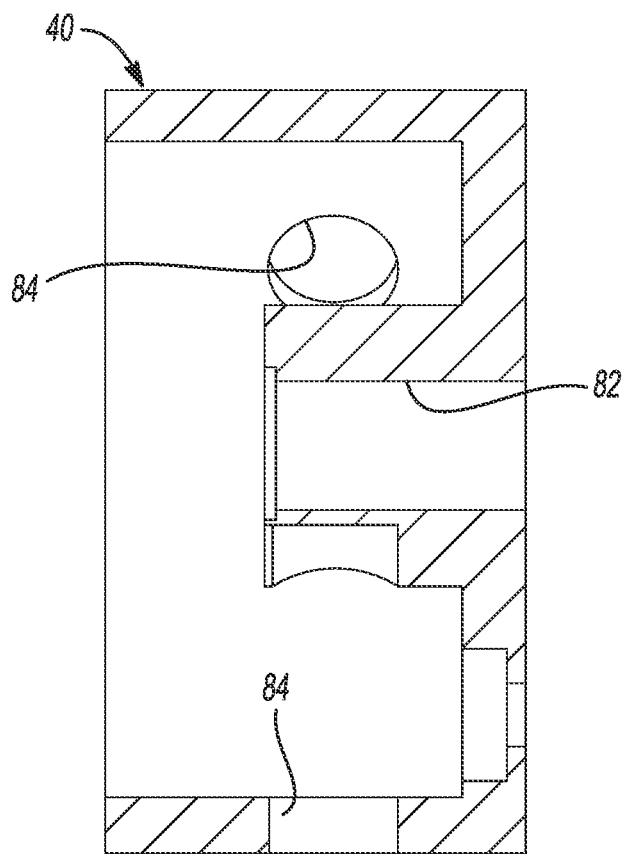
FIG. 19 is a cross sectional side view of the gearbox housing in accordance with section line 19-19 in FIG. 17.
Figure 20:
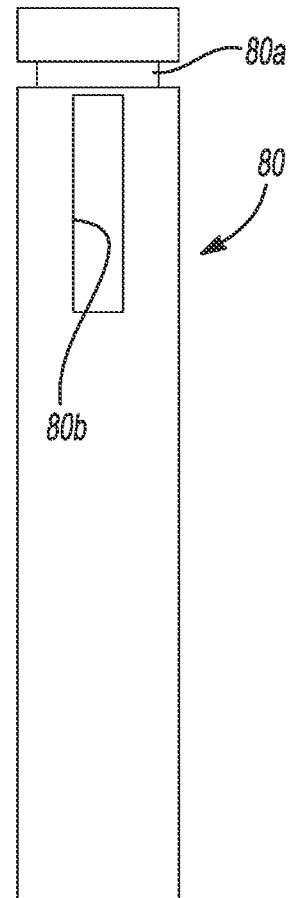
FIG. 20 is a side elevational view of a drive shaft.
Figure 21:
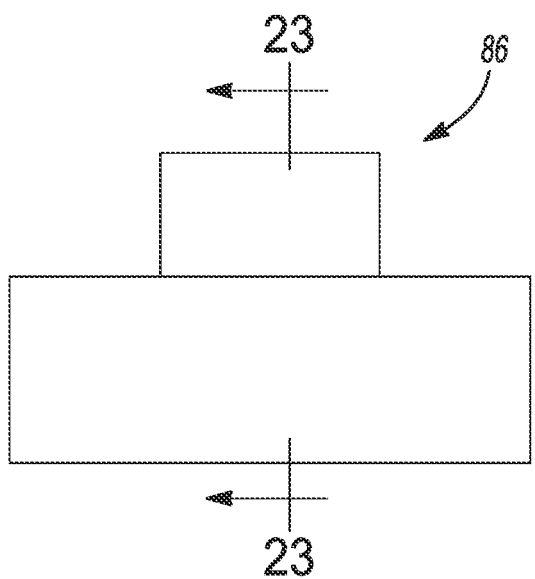
FIG. 21 is a side elevational view of a spring cup.
Figure 22:
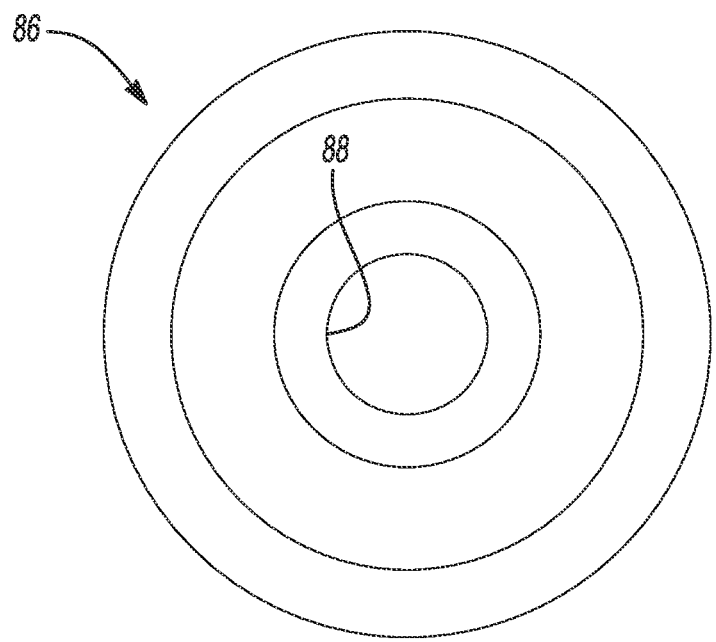
FIG. 22 is a plan view of the spring cup.
Figure 23:
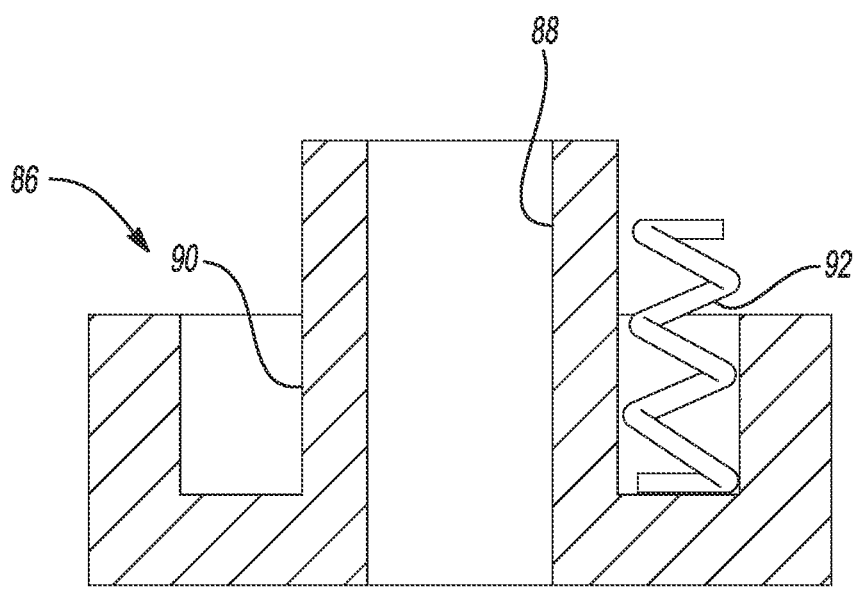
FIG. 23 is a side cross sectional view of the spring cup in accordance with section line 23-23 in FIG. 21, and also showing in simplified form a spring which is housed in the spring cup.

With brief reference to FIGS. 16-22, the construction of the gearbox 58 and its mounting within the gearbox housing 40 will be described in further detail. In FIG. 16 the gearbox 58 includes a drive shaft 80 (FIG. 20) which extends through a central bore 82 (FIGS. 18-20) in the gearbox housing 40. The gearbox housing 40 also includes three holes 84 (FIGS. 17-19) which enable distal inward ends of the acme screws 56 to project into an interior area of the gearbox housing 40. An upper end of the drive shaft 80 extends through a bore 88 in a spring cup 86. The spring cup 86 (FIGS. 21-23) includes a recess 90 for housing a spring 92 (FIG. 23) therein. Once fully assembled, the spring cup 86 is attached to the drive shaft 80. To facilitate this attachment the driveshaft 80 may include a small circumferential channel 80a (FIG. 20) which may receive a snap ring (not shown) which captures the spring cup 86 on the drive shaft 80 while under the biasing force of the spring 92.

With further specific reference to FIG. 16, the gearbox 58 includes a beveled ring gear 94 which is captured on the drive shaft 80 and fixedly secured to. In one example the coupling of the beveled ring gear 94 to the drive shaft may be accomplished with a conventional set screw (not shown) that goes through a portion of the beveled ring gear and positively engages within a slot 80b (FIG. 20) of the drive shaft 80. The teeth of the beveled ring gear 94 are in contact with three pinion gears 96 (only one being shown in FIG. 16 to avoid obscuring various other components). Each of the pinion gears 96 is fixedly secured fixedly to an inward distal end of an associated one of the acme screws 56 such that each pinion gear 96 rotates concurrently with rotation of its associated acme screw 56. As such, rotation of any one of the acme screws 56 causes a corresponding rotation of the beveled ring gear 94, which in turn causes a corresponding rotation of the other two pinion gears 96. In this manner, rotation of any one of the acme screws 56 causes a corresponding rotational movement of the other two acme screws 56, and thus corresponding linear movement of the other two capture subassemblies 54. The spring 92 and the spring cup 86 (FIG. 23) help to provide a constant biasing force which helps to keep the teeth of the beveled ring gear 94 in constant contact with the teeth of each of the pinion gears 96.

To affix the semi-spherical material support 12 to the base assembly 16, the support legs 14 are placed such that the flaring lower portions 76 are inserted through the elongated slots 32 in the main base 18. The capture subassemblies 54 should be positioned clear of the areas where the flaring lower portions 76 of the pull down studs 70 will project into before this placement occurs. Once the semi-spherical material support 12 is set in place on the main base 18, the semi-circular elements 14a will be resting on the diverging wall portions 28a of each elongated slot 26. At this point any one of the acme screws 56 may be rotated in the appropriate rotational direction to cause the capture subassemblies 54 to be simultaneously moved linearly into engagement with the flaring lower portions 76 of the pull down studs 70. As full engagement is made, a uniform downward force will be exerted on each pull down stud 70, thus securing the semi-spherical 12 in a highly stable manner to the base assembly 16. Releasing of the semi-spherical material support 12 is quick and easy, being accomplished simply by one or more rotational turns of any one of the acme screws 56, which causes simultaneous sliding disengagement of all of the flaring lower portions 76 with the capture subassemblies 54.

The mount apparatus 10 thus provides a quick, easy and highly reliable and repeatable means of mounting and precisely locating a material support substrate, and is especially useful in an additive manufacturing operation. And while the material support 12 has been illustrated as being semi-spherically shaped in this disclosure, the apparatus 10 is equally effective at securing support structures having other shapes (e.g., planar, pyramidal, angled, etc.). Essentially any material support structure to which three leg assemblies can be affixed can potentially be supported by the mount apparatus 10 described herein.

The mount apparatus 10 is especially useful in that it is not constrained to working with a material support structure of only one specific diameter or dimension, but easily accepts material support structures of differing dimensions. The ability of the mount apparatus 10 to provide highly repeatable and accurate positioning of the material support 12 is essential in many manufacturing operations, and particularly with additive manufacturing applications such as DIW applications.

The mount apparatus 10 is also of dimensions making it easily movable from one location to another. The equidistantly arranged legs of the base assembly 16 enable it to be used even on support surfaces which may not be perfectly planar, and still provide an exceptionally stable platform.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An axially symmetric, adjustable mount apparatus, comprising:
    a material support having a plurality of support legs, each one of said support legs having a distal portion;
    a base assembly having a plurality of laterally extending leg portions extending outwardly away from one another;
    a plurality of capture subassemblies slidably disposed within the laterally extending leg portions for releasably coupling to the distal portions of the plurality of support legs to hold the material support in a stable manner relative to the base assembly;
    a plurality of movable elements, each one of said plurality of movable elements being independently associated with one of the capture subassemblies for causing linear movement of a respective one of the capture subassemblies;
    a drive mechanism operably associated with the movable elements for causing simultaneous and equal linear movement of the capture subassemblies;
    each said capture subassembly configured to slidably engage with the distal portion of a respective one of the support legs to exert a force, in response to movement of its associated said movable element, to cause each said capture subassembly to capture the distal portion of one of the support legs, and to exert a force on each said support leg, to affix the material support securely to the base assembly.

2. The apparatus of claim 1, wherein each one of the laterally extending leg portions includes an elongated support well for receiving and supporting a portion of an associated one of the support legs.

3. The apparatus of claim 2, wherein the laterally extending leg portions each include a semi-spherical portion configured to rest in an associated one of the elongated support wells.

4. The apparatus of claim 1, wherein the base assembly includes a main base secured to a motion base; and
    wherein the main base includes an elongated guide channel formed in each one of the laterally extending leg portions for housing a respective one of the capture subassemblies.

5. The apparatus of claim 4, wherein the laterally extending leg portions comprise three laterally extending leg portions which are equidistantly circumferentially spaced from one another.

6. The apparatus of claim 5, wherein the capture subassemblies each include a plurality of preload studs for providing a biasing force to stabilize each said capture subassembly with its respective said elongated guide channel.

7. The apparatus of claim 6, further comprising a plurality of springs operably associated with the plurality of preload studs, for helping to provide the biasing force.

8. The apparatus of claim 7, wherein the plurality of movable elements each comprise a threaded lead screw; and the capture subassembly includes:
- a preload lower component;
- a preload upper component positioned on the preload lower component; and
- wherein the preload upper and lower components cooperatively form an elongated guide channel within each laterally extending leg of the base assembly; and
- wherein the capture subassembly is slidably movable within an associate one of the elongated guide channels.

9. The apparatus of claim 1, wherein each one of the movable elements comprises:
- a threaded lead screw; and
- a gear secured to one end of the movable element.

10. The apparatus of claim 9, wherein each one of said capture subassemblies includes a threaded drive element for receiving the threaded lead screw.

11. The apparatus of claim 10, wherein the base assembly includes the drive mechanism, and wherein the drive mechanism forms a gearbox, and the gearbox is in communication with each one of the gears, to enable rotational movement of all of the gears in response to rotational movement of any one of the gears.

12. The apparatus of claim 11, wherein the gearbox enables the simultaneous and equal linear movement of all the capture subassemblies when rotating any one of the threaded lead screws, and wherein the force exerted by each of the capture subassemblies is a clamping force exerted on the support legs.

13. The apparatus of claim 12, wherein all of the capture subassemblies move either simultaneously away from an axial center of the base or simultaneously toward an axial center of the base, in response to rotational movement of any one of the threaded lead screws in a given rotational direction.

14. The apparatus of claim 11, wherein the gearbox includes:
- a gearbox housing located at an axial center of the base assembly;
- a centrally disposed gear in communication with each of the gears associated with the threaded lead screws; and
- wherein rotation of any one of the threaded lead screws causes a corresponding rotational movement of the centrally disposed gear, which in turn causes a corresponding rotational movement of other ones of the gears associated with other ones of the threaded lead screws.

15. The apparatus of claim 1, wherein the material support forms a semi-spherical surface.

16. An adjustable mount apparatus, comprising:
- a material support having a plurality of equidistantly circumferentially arranged, depending support legs, each one of said support legs having a distal portion;
- a base assembly having a plurality of laterally extending support leg portions extending outwardly away from one another, each said laterally extending support leg portion including an elongated support well for supporting a portion of an associated one of the plurality of laterally extending support leg portions therein;
- a plurality of capture subassemblies slidably disposed within the laterally extending support leg portions for releasably coupling to the distal portions of the plurality of laterally extending support leg portions to hold the material support in a stable manner relative to the base assembly;
- a plurality of threaded lead screws, each one of the plurality of threaded lead screws being rotationally moveable and being independently associated with one of the capture subassemblies for causing linear movement of a respective one of the capture subassemblies;
- a plurality of gears, each one of said plurality of gears being fixedly secured to one end of an associated one of each of the plurality of threaded lead screws;
- a gear box disposed at an axial center of the base assembly and including a centrally disposed ring gear for interfacing with the gear associated with each said threaded lead screw, to enable corresponding rotational movement of all of the threaded lead screws when any one of the threaded lead screws is rotated, to thus enable corresponding simultaneous linear movement of all of the capture subassemblies when any one of the threaded lead screws is rotated; and
- each said capture subassembly configured to slidably engage with the distal portion of a respective one of the laterally extending support leg portions to exert a clamping force, in response to movement of its associated said movable element, to cause each said capture subassembly to capture the distal portion of one of the laterally extending support leg portions, and to exert a clamping force on each one of said laterally extending support leg portions, to affix the support securely to the base assembly.

17. The apparatus of claim 16, wherein the capture subassembly includes:
- a preload lower component;
- a preload upper component positioned on the preload lower component;
- a plurality of preload studs extending perpendicularly through both of the preload upper and lower components; and
- a coil spring associated with each one of said plurality of preload studs for providing a preload force to the capture subassembly to stabilize the capture subassembly within its respective said laterally extending support leg portion of the base assembly.

18. The apparatus of claim 17, wherein the lower preload component includes a plurality of projecting bumper stops for assisting in holding the preload upper component in a fixed orientation on the preload lower component.

19. The apparatus of claim 17, wherein each said laterally extending support leg portion includes a semi-spherical portion for resting within its associated said elongated support well.

* * * * *